United States Patent
Fukukawa et al.

(10) Patent No.: US 12,485,905 B2
(45) Date of Patent: Dec. 2, 2025

(54) VEHICLE MOTION CONTROLLER

(71) Applicants: ADVICS CO., LTD., Kariya (JP); TOYOTA JIDOSHA KABUSHIKI KAISHA, Toyota (JP)

(72) Inventors: Shogi Fukukawa, Tokyo (JP); Michihiro Otsubo, Tokyo (JP); Kazuki Miyake, Okazaki (JP); Akitsugu Sakai, Toyota (JP)

(73) Assignees: ADVICS CO., LTD., Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 267 days.

(21) Appl. No.: 17/931,224

(22) Filed: Sep. 12, 2022

(65) Prior Publication Data
US 2023/0086872 A1 Mar. 23, 2023

(30) Foreign Application Priority Data
Sep. 17, 2021 (JP) .................. 2021-151871

(51) Int. Cl.
*B60W 40/105* (2012.01)
*B60W 30/14* (2006.01)
*B60W 50/04* (2006.01)

(52) U.S. Cl.
CPC ........ *B60W 40/105* (2013.01); *B60W 30/143* (2013.01); *B60W 50/045* (2013.01); *B60W 2720/106* (2013.01)

(58) Field of Classification Search
CPC ............. B60W 40/105; B60W 30/143; B60W 50/045; B60W 2720/106
See application file for complete search history.

(56) References Cited

U.S. PATENT DOCUMENTS

2009/0048755 A1  2/2009  Tokimasa et al.
2010/0121550 A1* 5/2010  Inoue .................... B60W 10/06
                                                                701/93

(Continued)

FOREIGN PATENT DOCUMENTS

JP    2004-239207 A    8/2004
JP    2009-018681 A    1/2009

(Continued)

OTHER PUBLICATIONS

Office Action (Notice of Reasons for Refusal) issued Aug. 1, 2023, by the Japan Patent Office in corresponding Japanese Patent Application No. 2021-151871 and an English translation of the Office Action. (9 pages).

*Primary Examiner* — Navid Z. Mehdizadeh
*Assistant Examiner* — Oliver Tan
(74) *Attorney, Agent, or Firm* — BUCHANAN INGERSOLL & ROONEY PC

(57) ABSTRACT

A vehicle motion controller includes a feedback controlling unit that executes feedback control in which a difference between a target acceleration corresponding to a request value and an actual acceleration of a vehicle is an input, thereby calculating a control amount used to reduce the difference, a request outputting unit that calculates a request longitudinal force based on the control amount and outputs the request longitudinal force to the driving and braking devices, the request longitudinal force controlling the driving and braking devices, and a determining unit that, in a case where a driver of the vehicle is operating a braking operation member, obtains a braking command value and determines that operation interference by the driver has occurred when the braking command value is less than the request value. The feedback controlling unit prohibits the (Continued)

control amount from increasing in a case where the operation interference has occurred.

5 Claims, 6 Drawing Sheets

(56) References Cited

U.S. PATENT DOCUMENTS

| | | |
|---|---|---|
| 2010/0138123 A1 | 6/2010 | Tokimasa et al. |
| 2018/0186374 A1* | 7/2018 | Ando .................... G05D 1/0088 |
| 2019/0227546 A1* | 7/2019 | Sato ..................... G05D 1/0061 |
| 2020/0070849 A1 | 3/2020 | Suzuki et al. |
| 2020/0086870 A1* | 3/2020 | Takemori ............ B60W 10/101 |
| 2021/0171038 A1* | 6/2021 | Lee ................. B60W 30/18109 |

FOREIGN PATENT DOCUMENTS

| | | |
|---|---|---|
| JP | 2010-132032 A | 6/2010 |
| JP | 2019098972 A | 6/2019 |
| JP | 2020-032894 A | 3/2020 |

* cited by examiner

VEHICLE MOTION CONTROLLER

BACKGROUND

1. Field

The present disclosure relates to a vehicle motion controller that controls the motion of a vehicle.

2. Description of Related Art

Japanese Laid-Open Patent Publication No. 2019-98972 discloses a vehicle including a driving device that outputs a driving force, a braking device that outputs a braking force, and an autonomous drive controller that executes autonomous driving control by controlling the driving device and the braking device. The autonomous drive controller executes feedback control to adjust the driving force and the braking force, thereby eliminating the difference between a target acceleration and an actual acceleration.

During execution of the autonomous driving control disclosed in the above-described literature, a driver may perform an operation related to the acceleration of the vehicle. In this case, the autonomous driving control and the operation performed by the driver may interfere with each other. As described above, the feedback control is based on the difference between the target acceleration and the actual acceleration. Thus, when the driver is performing the operation, continuing the feedback control as in a case where the operation causes no interference would excessively increase or decrease the control amount. For example, the actual acceleration may be less likely to converge to the target acceleration. Additionally, control that contradicts an operation may be executed such that the vehicle accelerates when the driver performs an operation with the intention of decelerating the vehicle.

In the controller disclosed in the above-described literature, the vehicle needs to be controlled by taking the interference of an operation performed by the driver into account.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle motion controller according to an aspect of the present disclosure is employed in a vehicle that includes a driver assistance device that assists traveling of the vehicle, a driving device that transmits a driving force to the vehicle, and a braking device that applies a braking force to the vehicle. The vehicle motion controller automatically adjusts a traveling speed of the vehicle based on a request value from the driver assistance device. The vehicle motion controller includes a feedback controlling unit that executes feedback control in which a difference between a target acceleration corresponding to the request value and an actual acceleration of the vehicle is an input, thereby calculating a control amount used to reduce the difference, a request outputting unit that calculates a request longitudinal force based on the control amount and outputs the request longitudinal force to the driving device and the braking device, the request longitudinal force controlling the driving device and the braking device, and a determining unit that, in a case where a driver of the vehicle is operating a braking operation member that operates the braking device, obtains a braking command value calculated in correspondence with an operated amount of the braking operation member and determines that operation interference by the driver has occurred when the braking command value is less than the request value. The feedback controlling unit prohibits the control amount from increasing in a case where the operation interference has occurred.

A vehicle motion controller according to another aspect of the present disclosure is employed in a vehicle that includes a driver assistance device that assists traveling of the vehicle, a driving device that transmits a driving force to the vehicle, and a braking device that applies a braking force to the vehicle. The vehicle motion controller automatically adjusts a traveling speed of the vehicle based on a request value from the driver assistance device. The vehicle motion controller includes a feedback controlling unit that executes feedback control in which a difference between a target acceleration corresponding to the request value and an actual acceleration of the vehicle is an input, thereby calculating a control amount used to reduce the difference, a request outputting unit that calculates a request longitudinal force based on the control amount and outputs the request longitudinal force to the driving device and the braking device, the request longitudinal force controlling the driving device and the braking device, and a determining unit that, in a case where a driver of the vehicle is operating an acceleration operation member that operates the driving device, obtains an acceleration command value calculated in correspondence with an operated amount of the acceleration operation member and determines that operation interference by the driver has occurred when the acceleration command value is greater than the request value. The feedback controlling unit prohibits the control amount from decreasing in a case where the operation interference has occurred.

A vehicle motion controller according to a further aspect of the present disclosure is employed in a vehicle that includes a driver assistance device that assists traveling of the vehicle, a driving device that transmits a driving force to the vehicle, and a braking device that applies a braking force to the vehicle. The vehicle motion controller automatically adjusts a traveling speed of the vehicle based on a request value from the driver assistance device. The request value is an upper limit request value defined as an upper limit of a longitudinal force that indicates a force acting in a longitudinal direction of the vehicle. The vehicle motion controller includes a feedback controlling unit that executes feedback control in which a difference between a target acceleration corresponding to the upper limit request value and an actual acceleration of the vehicle is an input, thereby calculating a control amount used to reduce the difference, a request outputting unit that calculates a request longitudinal force based on the control amount and outputs the request longitudinal force to the driving device and the braking device, the request longitudinal force controlling the driving device and the braking device, and a determining unit that obtains an acceleration command value calculated in correspondence with an operated amount of an acceleration operation member that operates the driving device. The feedback controlling unit prohibits the control amount from increasing when the acceleration command value is less than the upper limit request value and permits the control amount to increase when the acceleration command value is greater than or equal to the upper limit request value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A vehicle motion controller 10 according to a first embodiment will now be described with reference to FIGS. 1 to 4.

Figure 1:
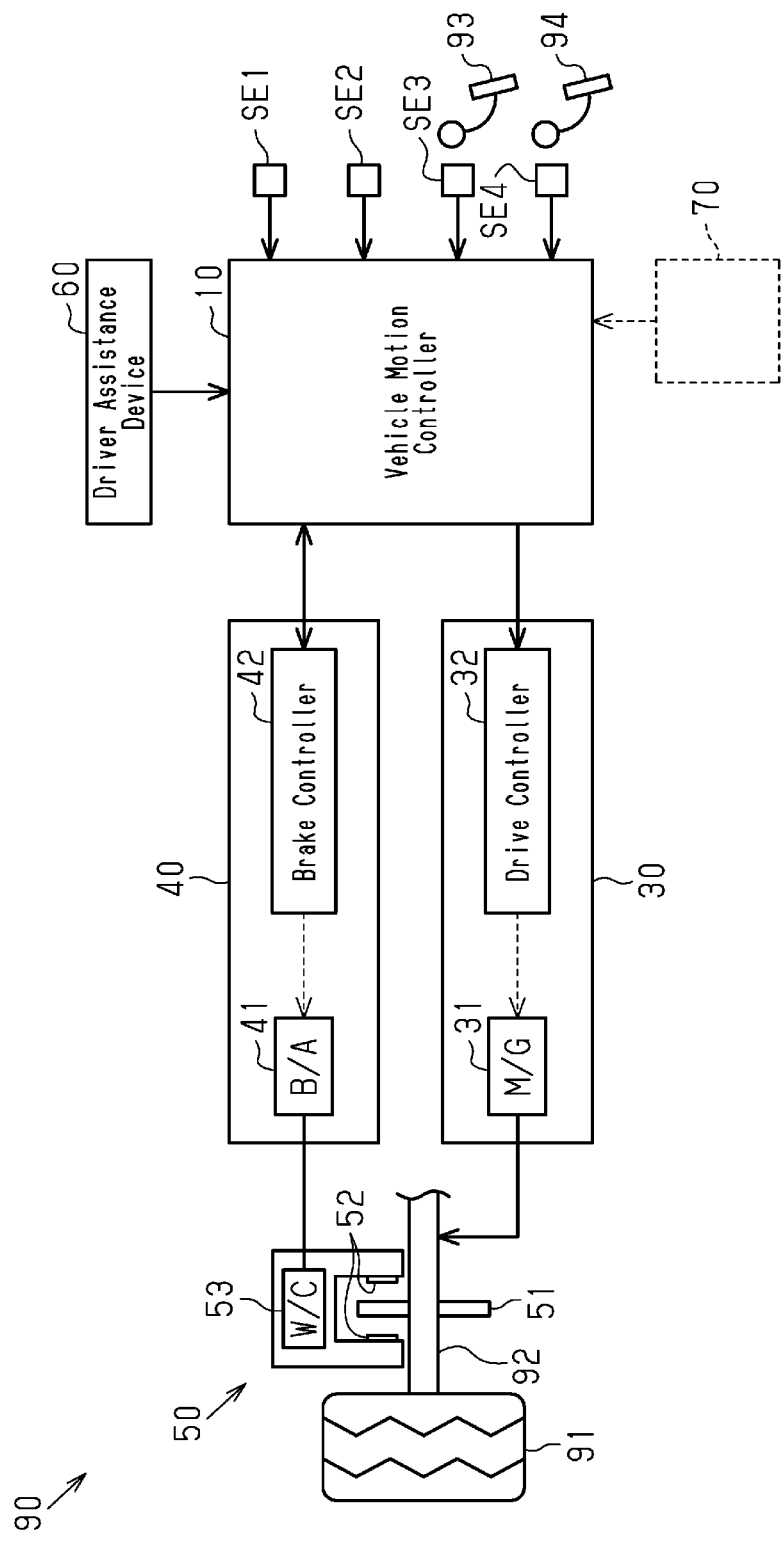
FIG. 1 is a schematic diagram showing a vehicle motion controller according to a first embodiment and a vehicle controlled by the vehicle motion controller.

FIG. 1 shows a vehicle 90 that includes the vehicle motion controller 10 having a driving device 30, a braking device 40, and a driver assistance device 60.

The vehicle motion controller 10 can manage the motion of the vehicle 90. Specifically, the vehicle motion controller 10 controls the motion of the vehicle 90 by adjusting a longitudinal force that indicates a force acting in a longitudinal direction of the vehicle 90. More specifically, the vehicle motion controller 10 controls the driving device 30 and the braking device 40 so as to adjust the acceleration of the vehicle 90 in the longitudinal direction, thereby adjusting the traveling speed of the vehicle 90.

FIG. 1 shows one of the axles 92 of the vehicle 90 and one of the wheels 91 that are respectively coupled to the axles 92.

The vehicle 90 includes operation members that can be operated by a driver of the vehicle 90. FIG. 1 shows an acceleration operation member 93 and a braking operation member 94 as the operation members. The acceleration operation member 93 is, for example, an accelerator pedal. The braking operation member 94 is, for example, a brake pedal.

The vehicle 90 may include an interior monitoring system 70. The interior monitoring system 70 includes a monitoring device and a monitoring system controller. The monitoring device is, for example, a camera that obtains information in the vehicle 90. The monitoring system controller is a processing circuit such as CPU. The monitoring system controller can process the information obtained by the monitoring device so as to send the information to the vehicle motion controller 10.

Driver Assistance Device

Figure 2:
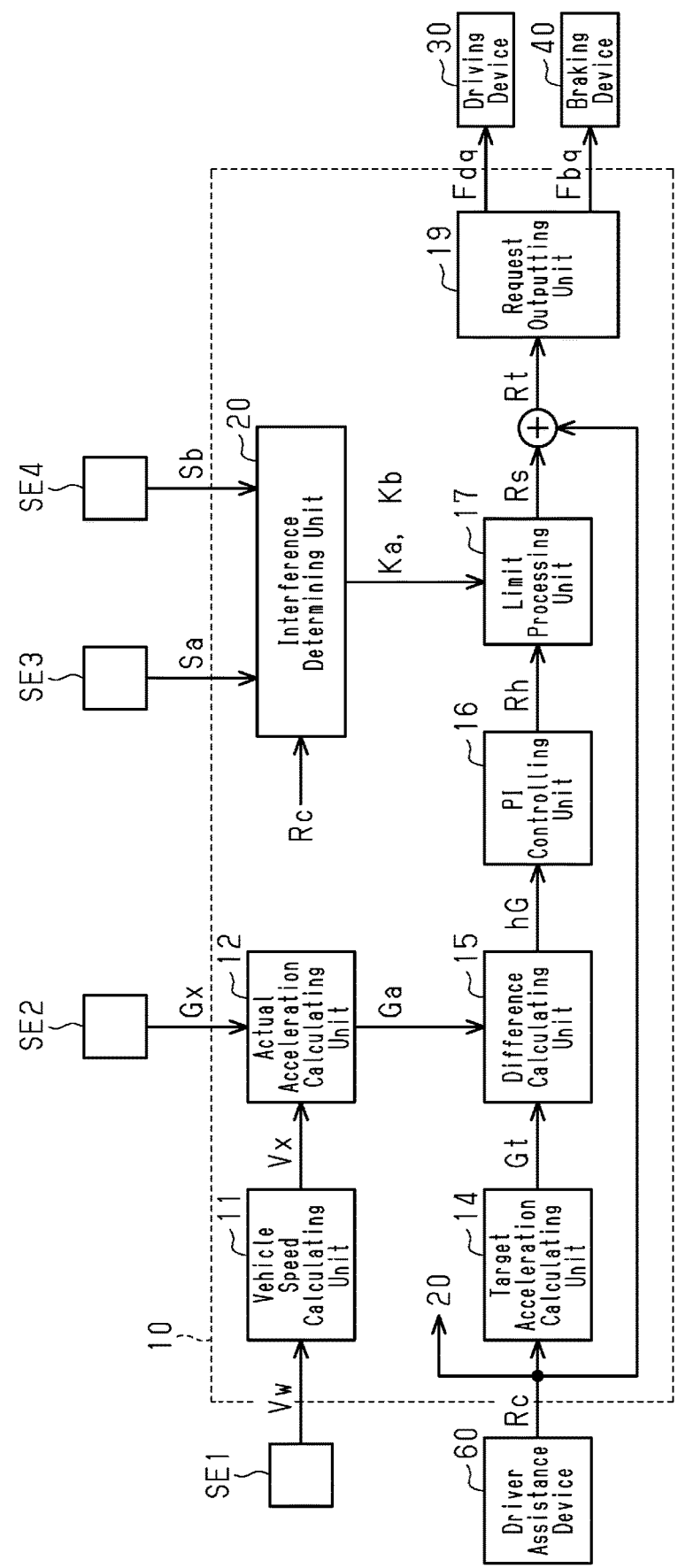
FIG. 2 is a block diagram of the vehicle motion controller shown in FIG. 1.

As shown in FIGS. 1 and 2, the driver assistance device 60 is connected to the vehicle motion controller 10. The driver assistance device 60 calculates a request value Rc used to assist the traveling of the vehicle 90. The driver assistance device 60 sends the request value Rc to the vehicle motion controller 10.

The request value Rc is a request value of the longitudinal force, which indicates a force acting in the longitudinal direction of the vehicle 90. When the request value Rc is positive, it indicates that the driver assistance device 60 requests acceleration of vehicle 90. When the request value Rc is negative, it indicates that the driver assistance device 60 requests deceleration of vehicle 90.

The driver assistance device 60 includes an obtaining device that obtains information of the surroundings of the vehicle 90. The obtaining device is, for example, a camera or a radar. The obtaining device can obtain the relative distances between the vehicle 90 and, for example, another vehicle and an obstacle that are located around the vehicle 90. The obtaining device can also obtain the shape of a road where the vehicle 90 travels and recognizing lanes. The driver assistance device 60 includes an assistance calculating unit that calculates the request value Rc. The assistance calculating unit is a processing circuit that calculates the request value Rc using the information obtained by the obtaining device.

Driving Device

The driving device 30 of the vehicle 90 is, for example, a device that generates a driving force using an electric motor. FIG. 1 shows a motor generator 31 as an actuator of the driving device 30. The driving force is transmitted to the vehicle 90 by causing the motor generator 31 to function as an electric motor. The driving force is transmitted to the wheel 91 via the axle 92. When the motor generator 31 functions as an electric generator, the vehicle 90 can receive a regenerative braking force.

The driving device 30 includes a drive controller 32, which is a processing circuit. The drive controller 32 functions to control the actuator of the driving device 30. For example, the drive controller 32 can generate the driving force by activating the motor generator 31 based on a driving request value Fdq that is sent from the vehicle motion controller 10. Further, the drive controller 32 can generate the driving force by activating the motor generator 31 in correspondence with an operated amount of the acceleration operation member 93. When the acceleration operation member 93 is operated during activation of the motor generator 31 based on the driving request value Fdq, the drive controller 32 may increase the driving request value Fdq in correspondence with the operated amount of the acceleration operation member 93. For example, the drive controller 32 can execute an override determining process that determines whether an override operation has been performed. For example, the drive controller 32 can determine that the override operation has been performed when an acceleration command value Sa is greater than the request value Rc, and activate the driving device 30 such that the operated amount of the acceleration operation member 93 is reflected on the driving force.

The actuator of the driving device 30 is not limited to an electric motor and may include an internal combustion engine and a transmission. Alternatively, the driving device 30 may include an electric motor, an internal combustion engine, and a transmission. As another option, the actuator of the driving device 30 may be an in-wheel motor in which an electric motor is coupled to the metal component of each wheel of a vehicle.

Braking Device

The braking device 40 of the vehicle 90 is, for example, a friction braking device. FIG. 1 shows a liquid pressure braking device as an example of the friction braking device. The braking device 40 includes a braking mechanism 50 that corresponds to each wheel 91 of the vehicle 90.

The braking mechanism 50 includes a wheel cylinder 53, a rotor 51 that rotates integrally with the wheel 91, and frictional members 52 that can be pressed against the rotor 51. The braking mechanism 50 is, for example, a disc brake. The braking mechanism 50 may be a drum brake.

As shown in FIG. 1, the braking device 40, which is a liquid pressure braking device, includes a liquid pressure generator. The braking device 40 includes a brake actuator 41 to which brake fluid is supplied from the liquid pressure generator.

The brake actuator 41 is connected to each wheel cylinder 53. The liquid pressure braking device can generate a frictional braking force in correspondence with a wheel cylinder (WC) pressure, which is liquid pressure in the wheel cylinder 53 of the braking mechanism 50. In the braking mechanism 50, the higher the WC pressure, the greater the force that presses the frictional members 52 against the rotor 51, which rotates integrally with the wheel 91. The higher the WC pressure, the greater the braking force applied to the wheel 91 by each braking mechanism 50. The WC pressure is an example of a value that indicates a pressing force that presses the frictional members 52 against the rotor 51.

The braking device 40 includes a brake controller 42, which is a processing circuit. The brake controller 42 functions to control the brake actuator 41 of the braking device 40. For example, the brake controller 42 can generate the braking force by activating the brake actuator 41 based on a braking request value Fbq that is sent from the vehicle motion controller 10. Further, the brake controller 42 can generate the braking force by activating the brake actuator 41 in correspondence with an operated amount of the braking operation member 94. When the braking operation member 94 is operated during activation of the brake actuator 41 based on the braking request value Fbq, the brake controller 42 may decrease the braking request value Fbq in correspondence with the operated amount of the braking operation member 94. For example, the brake controller 42 can execute the override determining process, which determines whether the override operation has been performed. For example, the brake controller 42 can determine that the override operation has been performed when a braking command value Sb is less than the request value Rc, and activate the braking device 40 such that the operated amount of the braking operation member 94 is reflected on the braking force.

Longitudinal Force

In the dimension of the longitudinal force, when the value is positive, the longitudinal force acts in a direction in which the vehicle 90 is accelerated. When the value is negative, the longitudinal force acts in a direction in which the vehicle 90 is decelerated. In the dimension of the longitudinal force, as the value becomes farther from 0, it indicates that the force acting on the vehicle 90 increases.

In the driving device 30, when the driving request value Fdq is positive, the motor generator 31 is controlled such that the driving force increases as the driving request value Fdq increases. When the driving request value Fdq is 0, the driving device 30 transmits no driving force.

In the braking device 40, the brake actuator 41 is controlled such that the braking force increases as the braking request value Fbq decreases. When the braking request value Fbq is 0, the braking device 40 applies no braking force. The maximum value of the braking request value Fbq is 0.

The driving request value Fdq may be calculated as a negative value. When the driving request value Fdq is negative, it indicates that a regenerative braking force is requested, for example. In the driving device 30, when the driving request value Fdq is negative, the motor generator 31 is controlled such that the regenerative braking force increases as the driving request value Fdq decreases. In the case of using an internal combustion engine as the driving device 30, when the driving request value Fdq is negative, it indicates that engine braking is requested.

The relationship between the acceleration command value Sa and the driving force will now be described. The greater the operated amount of the acceleration operation member 93, the greater the calculated acceleration command value Sa. The drive controller 32 can control the driving device 30 such that the driving force increases as the acceleration command value Sa increases. That is, the drive controller 32 can control the motor generator 31 such that the driving force increases as the operated amount of the acceleration operation member 93 increases.

The relationship between the braking command value Sb and the braking force will now be described. The greater the operated amount of the braking operation member 94, the smaller the calculated braking command value Sb. The brake controller 42 can control the braking device 40 such that the braking force increases as the braking command value Sb decreases. That is, the brake controller 42 can control the brake actuator 41 such that the braking force increases as the operated amount of the braking operation member 94 increases.

Sensors

The vehicle 90 includes various types of sensors. FIGS. 1 and 2 show a wheel speed sensor SE1, a longitudinal acceleration sensor SE2, an acceleration operation sensor SE3, and a braking operation sensor SE4 as examples of the various sensors. Detection signals from the various sensors are input to the vehicle motion controller 10.

The wheel speed sensor SE1 detects a wheel speed Vw. The wheel speed sensor SE1 is disposed at each wheel 91. Based on the detection signal from the wheel speed sensor SE1, the vehicle motion controller 10 can calculate the wheel speed Vw of each wheel 91. Based on each wheel speed Vw, the vehicle motion controller 10 can calculate a vehicle speed Vx. The vehicle speed Vx indicates the traveling speed of the vehicle 90.

The longitudinal acceleration sensor SE2 detects the acceleration in the longitudinal direction of the vehicle 90. The vehicle motion controller 10 can obtain the detection signal from the longitudinal acceleration sensor SE2 as an acceleration detected value Gx.

The acceleration operation sensor SE3 detects the operated amount of the acceleration operation member 93. Based on a detected value of the acceleration operation sensor SE3, the vehicle motion controller 10 can calculate the acceleration command value Sa. The acceleration command value Sa is calculated as a value indicating a request value of the longitudinal force.

The braking operation sensor SE4 detects the operated amount of the braking operation member 94. Based on a detected value of the braking operation sensor SE4, the vehicle motion controller 10 can calculate the braking command value Sb. The braking command value Sb is calculated as a value indicating a request value of the longitudinal force. The braking command value Sb is less than or equal to 0.

Vehicle Motion Controller

The vehicle motion controller 10 will now be described. The vehicle motion controller 10 executes driver assistance control that automatically adjusts the traveling speed of the vehicle 90 based on the request value Rc from the driver assistance device 60. Examples of the driver assistance control include control of autonomous driving, autonomous parking, adaptive cruise control, lane keep assist, and collision avoidance braking.

The vehicle motion controller 10 is connected to the drive controller 32 and the brake controller 42. Information can be exchanged between the vehicle motion controller 10, the drive controller 32, and the brake controller 42. The drive controller 32 and the brake controller 42 can exchange information via the vehicle motion controller 10. The drive controller 32 and the brake controller 42 may be directly connected to each other. In this case, information can be exchanged between the drive controller 32 and the brake controller 42.

The vehicle motion controller 10 is a processing circuit including functional units that execute various types of control. FIG. 2 shows a vehicle speed calculating unit 11, an actual acceleration calculating unit 12, a target acceleration calculating unit 14, a difference calculating unit 15, a proportional-integral (PI) controlling unit 16, a limit processing unit 17, an interference determining unit 20, and a request outputting unit 19 as examples of the functional units. The functional units of the vehicle motion controller 10 can exchange information with each other.

The vehicle speed calculating unit 11 calculates the traveling speed of the vehicle 90, namely, the vehicle speed Vx, from the wheel speed Vw, which is based on the detection signal of the wheel speed sensor SE1.

The actual acceleration calculating unit 12 calculates an actual acceleration Ga from a value obtained by differentiating the vehicle speed Vx with respect to time and from the acceleration detected value Gx, which is based on the detection signal of the longitudinal acceleration sensor SE2.

Based on the request value Rc sent from the driver assistance device 60, the target acceleration calculating unit 14 calculates a target acceleration Gt. More specifically, the target acceleration calculating unit 14 calculates the target acceleration Gt by converting the request value Rc, which has a dimension of the longitudinal force, into an acceleration. When the vehicle 90 is requested to accelerate, the target acceleration Gt has a positive value. When the vehicle 90 is requested to decelerate, the target acceleration Gt has a negative value.

The difference calculating unit 15 calculates a difference hG in the acceleration by subtracting the actual acceleration Ga, which has been calculated by the actual acceleration calculating unit 12, from the target acceleration Gt, which has been calculated by the target acceleration calculating unit 14.

The PI controlling unit 16 and the limit processing unit 17 correspond to a feedback controlling unit. Based on the difference hG, the feedback controlling unit calculates a feedback control amount used to reduce the difference hG. The feedback controlling unit outputs a limit control amount Rs as the feedback control amount.

The request outputting unit 19 calculates a control amount used to control the driving device 30 and the braking device 40. For example, the request outputting unit 19 calculates a request longitudinal force used to control the driving device 30 and the braking device 40. The request outputting unit 19 outputs the driving request value Fdq and the braking request value Fbq as the request longitudinal force. In the vehicle motion controller 10, the sum of the request value Rc and the limit control amount Rs is input to the request outputting unit 19 as a corrected request value Rt. That is, the greater the limit control amount Rs, the greater the corrected request value Rt. The smaller the limit control amount Rs, the smaller the corrected request value Rt. The request outputting unit 19 calculates the driving request value Fdq and the braking request value Fbq in correspondence with the corrected request value Rt. The request outputting unit 19 outputs the driving request value Fdq to the driving device 30. The request outputting unit 19 outputs the braking request value Fbq to the braking device 40. The control amount calculated and output by the request outputting unit 19 is not limited to a value in the dimension of the longitudinal force. The control amount calculated and output by the request outputting unit 19 may be a value in the dimension of an acceleration or a value in the dimension of a force.

The interference determining unit 20 determines whether an operation performed by the driver of the vehicle 90 interferes with the driver assistance control. The acceleration command value Sa, the braking command value Sb, and the request value Rc are input to the interference determining unit 20. Based on the acceleration command value Sa, the braking command value Sb, and the request value Rc, the interference determining unit 20 determines whether operation interference has occurred. When operation interference has occurred, the interference determining unit 20 sets at least one of an increase prohibiting flag Ka and a decrease prohibiting flag Kb to ON in correspondence with a situation in which the operation interference has occurred. The details of a flag operation executed by the interference determining unit 20 will be described later.

Feedback Controlling Unit

The feedback controlling unit will now be described in more detail.

As shown in FIG. 2, the PI controlling unit 16 outputs a feedback (FB) control amount Rh based on the difference hG. The calculation executed by the PI controlling unit 16 includes proportional control and integral control. The PI controlling unit 16 calculates the FB control amount Rh as the feedback control amount, which is used to reduce the difference hG. While calculating the FB control amount Rh, the PI controlling unit 16 converts the value of the FB control amount Rh into the dimension of the longitudinal force.

In the feedback controlling unit, while at least one of the increase prohibiting flag Ka and the decrease prohibiting flag Kb is ON, the PI controlling unit 16 suspends the integral control. Even during a period in which the integral control is suspended, the PI controlling unit 16 continues calculation of the FB control amount Rh. That is, an integral term is not added to the FB control amount Rh calculated in this period.

As shown in FIG. 2, the FB control amount Rh is input to the limit processing unit 17. The limit processing unit 17 outputs the limit control amount Rs in correspondence with the increase prohibiting flag Ka and the decrease prohibiting flag Kb.

When the increase prohibiting flag Ka and the decrease prohibiting flag Kb are OFF, the limit processing unit 17 outputs the input FB control amount Rh as the limit control amount Rs.

When the increase prohibiting flag Ka is ON, the limit processing unit 17 prohibits the feedback control amount from increasing. This process will now be described in detail. When the FB control amount Rh is input to the limit processing unit 17 from the PI controlling unit 16 with the increase prohibiting flag Ka ON, the limit processing unit 17 compares the input FB control amount Rh with the limit control amount Rs that was previously output. When the input FB control amount Rh is greater than or equal to the limit control amount Rs that was previously output, the limit processing unit 17 outputs a limit control amount Rs having the same value as the limit control amount Rs that was previously output. When the input FB control amount Rh is less than the limit control amount Rs that was previously output, the limit processing unit 17 outputs the input FB control amount Rh as the limit control amount Rs.

When the decrease prohibiting flag Kb is ON, the limit processing unit 17 prohibits the feedback control amount from decreasing. This process will now be described in detail. When the FB control amount Rh is input to the limit processing unit 17 from the PI controlling unit 16 with the decrease prohibiting flag Kb ON, the limit processing unit 17 compares the input FB control amount Rh with the limit control amount Rs that was previously output. When the input FB control amount Rh is less than or equal to the limit control amount Rs that was previously output, the limit processing unit 17 outputs a limit control amount Rs having the same value as the limit control amount Rs that was previously output. When the input FB control amount Rh is greater than the limit control amount Rs that was previously output, the limit processing unit 17 outputs the input FB control amount Rh as the limit control amount Rs.

Interference Determining Unit

The function of the interference determining unit 20 will now be described in detail with examples.

Figure 3:
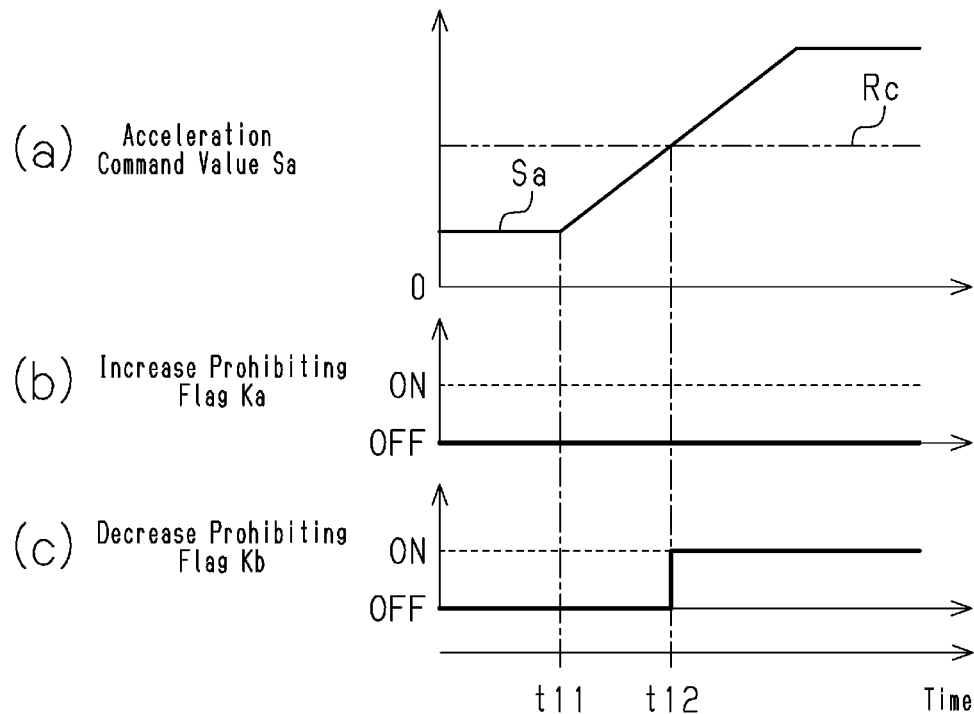
FIG. 3 is a graph illustrating a process executed by the vehicle motion controller shown in FIG. 1.

FIG. 3 shows an example of a case where operation interference is caused by the operation of the acceleration operation member 93 when the driver assistance control is executed. When the driver is operating the acceleration operation member 93, that is, when the acceleration command value Sa is not 0, the interference determining unit 20 determines whether the operation interference caused by the operation of the acceleration operation member 93 has occurred. When the driver is not operating the acceleration operation member 93, that is, when the acceleration command value Sa is 0, the interference determining unit 20 determines that the operation interference caused by the operation of the acceleration operation member 93 has not occurred. Section (a) of FIG. 3 shows the acceleration command value Sa and the request value Rc that are input to the interference determining unit 20. In the example shown in FIG. 3, the request value Rc is positive as shown in section (a) of FIG. 3. It is assumed that the request value Rc remains unchanged over the period illustrated in FIG. 3. As shown in section (a) of FIG. 3, after the point in time t11, the operated amount of the acceleration operation member 93 is increased so that the acceleration command value Sa increases. After the point in time t12, the acceleration command value Sa increasing after the point in time t11 is greater than the request value Rc.

When the acceleration command value Sa is not 0 and is greater than the request value Rc, the interference determining unit 20 determines that the operation interference has occurred. Then, the interference determining unit 20 sets the decrease prohibiting flag Kb to ON. That is, the interference determining unit 20 determines that the operation interference occurs at the point in time t12. As shown in section (c) of FIG. 3, the interference determining unit 20 sets the decrease prohibiting flag Kb to ON at the point in time t12. As a result, the limit processing unit 17 prohibits the feedback control amount from decreasing after the point in time t12.

When the acceleration command value Sa decreases to less than or equal to the request value Rc, the interference determining unit 20 determines that the operation interference has been cancelled. Then, the interference determining unit 20 sets the decrease prohibiting flag Kb to OFF.

In the example shown in FIG. 3, the increase prohibiting flag Ka shown in section (b) of FIG. 3 is not activated by the interference determining unit 20. That is, the increase prohibiting flag Ka remains OFF after the point in time t12. As a result, the limit processing unit 17 does not prohibit the feedback control amount from increasing. Thus, the feedback control amount is permitted to increase even after the point in time t12.

Figure 4:
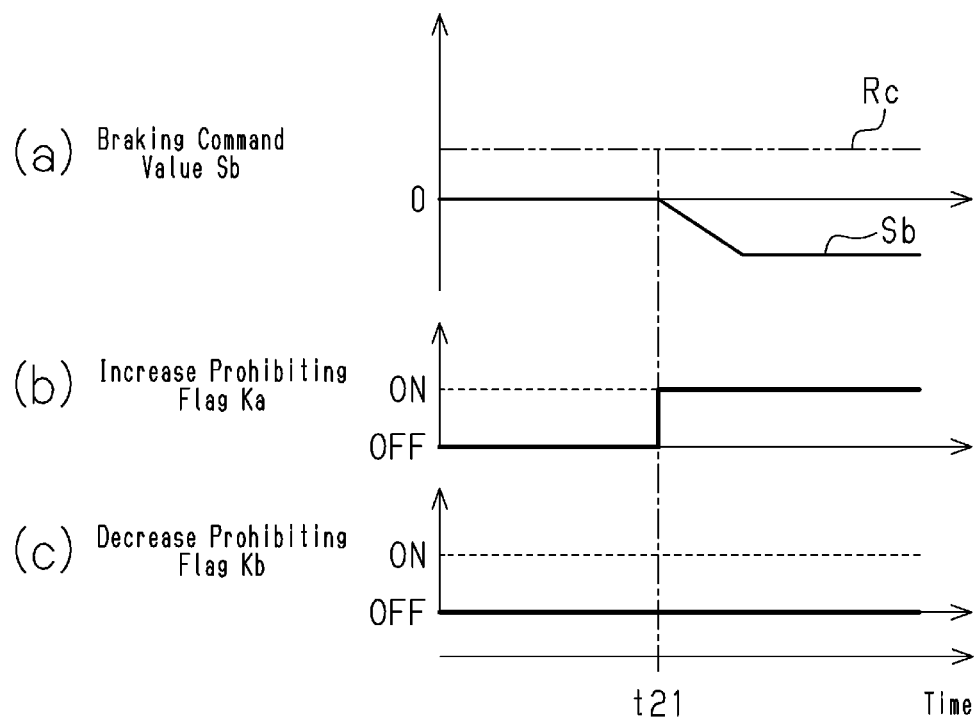
FIG. 4 is a graph illustrating a process executed by the vehicle motion controller shown in FIG. 1.
Figure 5:
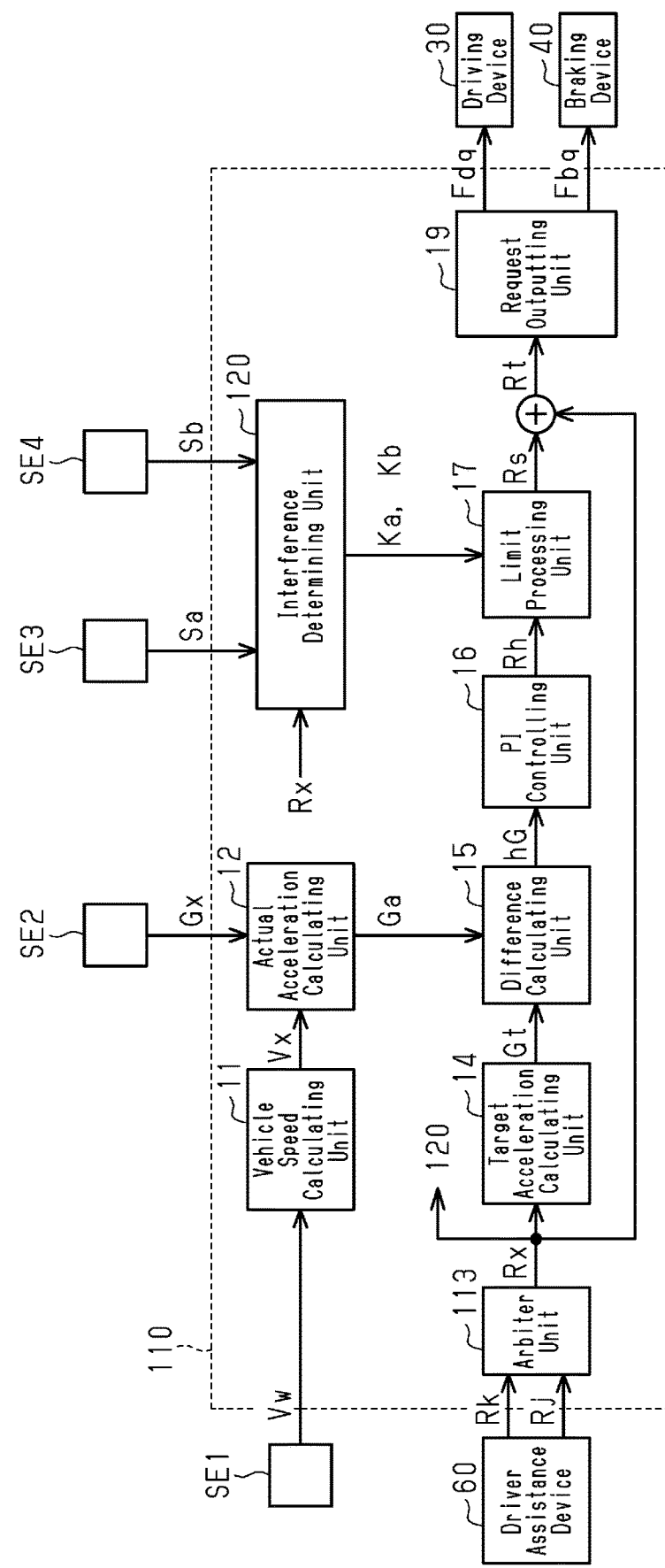
FIG. 5 is a block diagram of a vehicle motion controller according to a second embodiment.

FIG. 4 shows an example of a case where the braking operation member 94 is operated when the driver assistance control is executed. When the driver is operating the braking operation member 94, that is, when the braking command value Sb is not 0, the interference determining unit 20 determines whether operation interference caused by the operation of the braking operation member 94 has occurred. When the driver is not operating the braking operation member 94, that is, when the braking command value Sb is 0, the interference determining unit 20 determines that the operation interference caused by the operation of the braking operation member 94 has not occurred. Section (a) of FIG. 4 shows the braking command value Sb and the request value Rc that are input to the interference determining unit 20. In the example shown in FIG. 4, the request value Rc is positive as shown in section (a) of FIG. 4. It is assumed that the request value Rc remains unchanged over the period illustrated in FIG. 4. As shown in section (a) of FIG. 4, the braking command value Sb is 0 in a period prior to the point in time t21. That is, in the period prior to the point in time t21, the braking operation member 94 is not operated. Thus, in the period prior to the point in time t21, the interference determining unit 20 does not determine whether the interference has occurred. At the point in time t21, the braking operation member 94 starts to be operated. After the point in time t21, the operated amount of the braking operation member 94 is increased so that the braking command value Sb becomes negative.

When the braking command value Sb is not 0 and is less than the request value Rc, the interference determining unit 20 determines that the operation interference has occurred. Then, the interference determining unit 20 sets the increase prohibiting flag Ka to ON. Since the request value Rc is positive in the example shown in FIG. 4, the braking command value Sb is less than the request value Rc from the point in time at which the braking operation member 94 starts to be operated and the braking command value Sb starts to be calculated. That is, after the point in time t21, the interference determining unit 20 determines that the braking command value Sb is less than the request value Rc and determines that the operation interference occurs. As shown in section (b) of FIG. 4, the interference determining unit 20 sets the increase prohibiting flag Ka to ON at the point in time t21. As a result, the limit processing unit 17 prohibits the feedback control amount from increasing after the point in time t21.

When the operation of the braking operation member 94 is cancelled, the interference determining unit 20 determines that the operation interference has been cancelled. Then, the interference determining unit 20 sets the increase prohibiting flag Ka to OFF. Unlike the example in shown in FIG. 4, in a case where the request value Rc is negative, the interference determining unit 20 determines that the operation interference has been cancelled when the braking command value Sb is increased so that the braking command value Sb becomes greater than or equal to the request value Rc. Then, the interference determining unit 20 sets the increase prohibiting flag Ka to OFF.

In the example shown in FIG. 4, the decrease prohibiting flag Kb shown in section (c) of FIG. 4 is not activated by the interference determining unit 20. That is, the decrease prohibiting flag Kb remains OFF after the point in time t21. As a result, the limit processing unit 17 does not prohibit the feedback control amount from decreasing. Thus, the feedback control amount is permitted to decrease even after the point in time t21.

Operation and Advantages

The operation and advantages of the first embodiment will now be described.

During execution of the driver assistance control, when the braking command value Sb obtained by operating the braking operation member 94 by the driver of the vehicle 90, becomes less than the request value Rc, the driver's operation may include an intention of setting the current traveling speed to be less than a traveling speed that is automatically adjusted. In this case, if the feedback control amount output by the feedback controlling unit is increased, the traveling speed may further increase, thereby making the driver annoyed.

In this regard, the vehicle motion controller 10 prohibits the feedback control amount from increasing when operation interference in which the braking command value Sb becomes less than the request value Rc has occurred. More specifically, the limit processing unit 17 outputs the limit control amount Rs that is prohibited from increasing. Thus, the driver who performed an operation during automatic adjustment of the traveling speed of the vehicle 90 is less likely to feel annoyed. Accordingly, the feedback control is continuously executed even when the operation interference has occurred while taking operation interference into account.

The vehicle motion controller 10 prohibits the feedback control amount from increasing and thus prevents the feedback control amount from excessively increasing, as compared with when the feedback control amount is not prohibited from increasing. Thus, the time for the actual acceleration Ga to converge to the target acceleration Gt is prevented from increasing.

During execution of the driver assistance control, when the acceleration command value Sa obtained by operating the acceleration operation member 93 by the driver of the vehicle 90 becomes greater than the request value Rc, the driver's operation may include an intention of setting the current traveling speed to be greater than a traveling speed that is automatically adjusted. In this case, if the feedback control amount output by the feedback controlling unit is decreased, the traveling speed may further decrease, thereby making the driver annoyed.

In this regard, the vehicle motion controller 10 prohibits the feedback control amount from decreasing when operation interference that in which the acceleration command value Sa becomes greater than the request value Rc has occurred. More specifically, the limit processing unit 17 outputs the limit control amount Rs that is prohibited from decreasing. Thus, the driver who performed an operation during automatic adjustment of the traveling speed of the vehicle 90 is less likely to feel annoyed. Accordingly, the feedback control is continuously executed even when the operation interference has occurred while taking operation interference into account.

When the acceleration command value Sa is greater than the request value Rc, as illustrated in FIG. 3, the vehicle motion controller 10 permits the feedback control amount to increase while prohibiting the feedback control amount from decreasing. Thus, when the difference hG is reduced by an increase in the feedback control amount, the limit control amount Rs is calculated such that the actual acceleration Ga converges to the target acceleration Gt.

When the braking command value Sb is less than the request value Rc, as illustrated in FIG. 4, the vehicle motion controller 10 permits the feedback control amount to decrease while prohibiting the feedback control amount from increasing. Thus, when the difference hG is reduced by a decrease in the feedback control amount, the limit control amount Rs is calculated such that the actual acceleration Ga converges to the target acceleration Gt.

The vehicle motion controller 10 allows the feedback control to be continued even when operation interference has occurred. More specifically, the feedback controlling unit continues to calculate the FB control amount Rh even when operation interference has occurred. This allows the feedback control that reduces the difference hG between the target acceleration Gt and the actual acceleration Ga to be executed continuously.

The vehicle motion controller 10 suspends the integral control when operation interference has occurred. Thus, the FB control amount Rh is unaffected by the elapse of time in a period in which interference is caused by the driver's operation. This allows the feedback control to be executed continuously.

Second Embodiment

A vehicle motion controller 110 according to a second embodiment will now be described with reference to FIGS. 5 to 9. The components of the vehicle motion controller 110 of the second embodiment that differ from those of the vehicle motion controller 10 of the first embodiment will be hereinafter described. The components of the vehicle motion controller 110 that are the same as those of the vehicle motion controller 10 of the first embodiment will not be described.

In the first embodiment, the driver assistance device 60 sends the request value Rc to the vehicle motion controller 10. In the second embodiment, the driver assistance device 60 calculates an upper limit request value Rj and a lower limit request value Rk. The driver assistance device 60 sends the upper limit request value Rj and the lower limit request value Rk, instead of the request value Rc. The upper limit request value Rj is defined as the upper limit of the longitudinal force acting in the longitudinal direction of the vehicle 90. The lower limit request value Rk is defined as the lower limit of the longitudinal force acting in the longitudinal direction of the vehicle 90.

The vehicle motion controller 110 further includes an arbiter unit 113. The upper limit request value Rj and the lower limit request value Rk are input to the arbiter unit 113. The arbiter unit 113 compares the upper limit request value Rj and the lower limit request value Rk with each other and outputs the smaller request value as an arbitrated request value Rx. That is, when the upper limit request value Rj is less than the lower limit request value Rk, the upper limit request value Rj is output as the arbitrated request value Rx. In contrast, when the lower limit request value Rk is less than the upper limit request value Rj, the lower limit request value Rk is output as the arbitrated request value Rx.

The target acceleration calculating unit 14 uses the arbitrated request value Rx to calculate the target acceleration Gt.

Based on the arbitrated request value Rx (i.e., upper limit request value Rj or lower limit request value Rk), the acceleration command value Sa, and the braking command value Sb, an interference determining unit 120 determines whether operation interference has occurred.

In the vehicle motion controller 110, the sum of the arbitrated request value Rx, which is output by the arbiter unit 113, and the limit control amount Rs, which is output by the limit processing unit 17, is input to the request outputting unit 19 as the corrected request value Rt.

Interference Determining Unit

The function of the interference determining unit 120 will now be described in detail with examples.

First, a case where the arbitrated request value Rx is the lower limit request value Rk will be described with reference to FIGS. 6 and 7. In the examples shown in FIGS. 6 and 7, the lower limit request value Rk is positive as shown in section (a) of FIG. 6 and section (a) of FIG. 7. It is assumed that the lower limit request value Rk remains unchanged over the periods illustrated in FIGS. 6 and 7.

Figure 6:
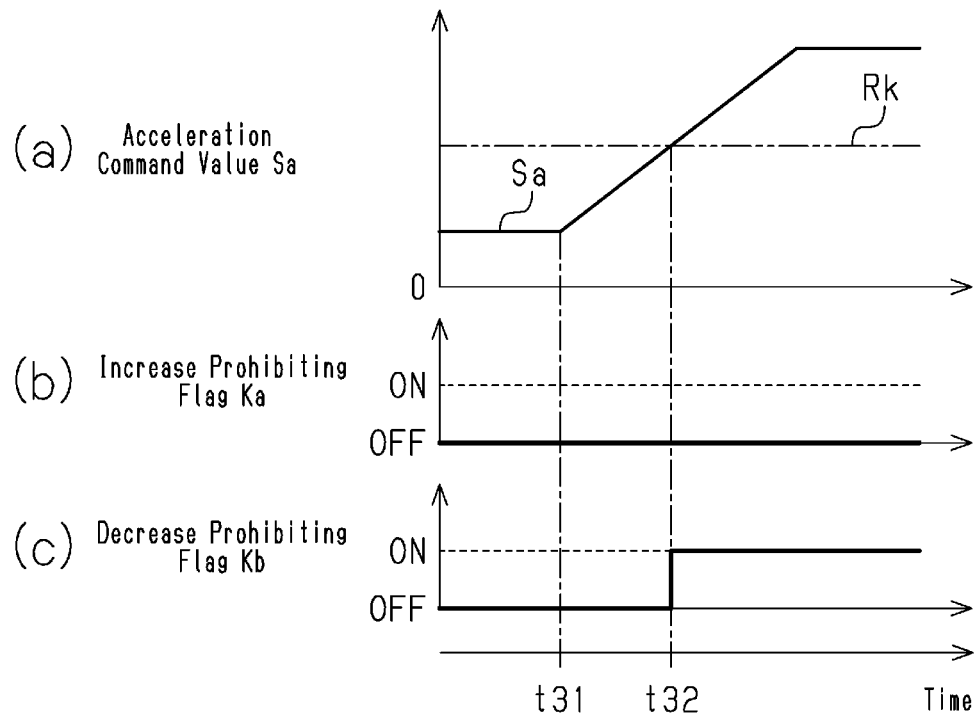
FIG. 6 is a graph illustrating a process executed by the vehicle motion controller shown in FIG. 5.

FIG. 6 shows an example of a case where operation interference is caused by the operation of the acceleration operation member 93 when the driver assistance control is executed. As shown in section (a) of FIG. 6, after the point in time t31, the operated amount of the acceleration operation member 93 is increased so that the acceleration command value Sa increases. After the point in time t32, the acceleration command value Sa increasing after the point in time t31 is greater than the lower limit request value Rk.

When the acceleration command value Sa is not 0 and is greater than the lower limit request value Rk, the interference determining unit 120 determines that the operation interference has occurred. Then, the interference determining unit 120 sets the decrease prohibiting flag Kb to ON. That is, the interference determining unit 120 determines that the operation interference occurs at the point in time t32. As shown in section (c) of FIG. 6, the interference determining unit 120 sets the decrease prohibiting flag Kb to ON at the point in time t32. As a result, the limit processing unit 17 prohibits the feedback control amount from decreasing after the point in time t32.

When the acceleration command value Sa decreases to less than or equal to the lower limit request value Rk, the interference determining unit 120 determines that the operation interference has been cancelled. Then, the interference determining unit 120 sets the decrease prohibiting flag Kb to OFF.

In the example shown in FIG. 6, the increase prohibiting flag Ka shown in section (b) of FIG. 6 is not activated by the interference determining unit 120. That is, the increase prohibiting flag Ka remains OFF after the point in time t32. As a result, the limit processing unit 17 does not prohibit the feedback control amount from increasing. Thus, the feedback control amount is permitted to increase even after the point in time t32.

Figure 7:
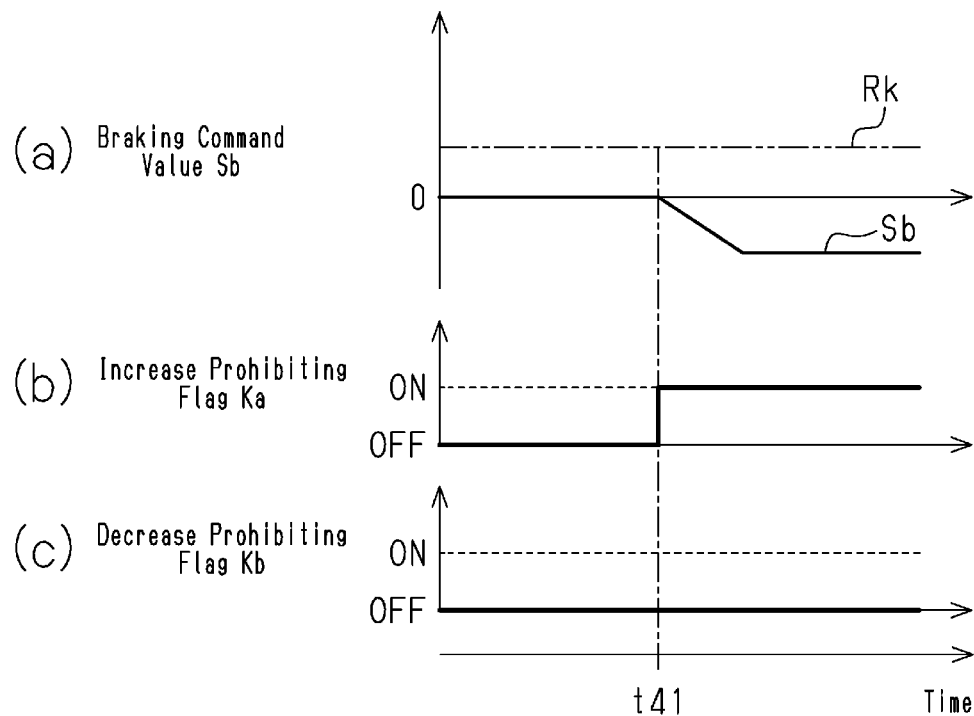
FIG. 7 is a graph illustrating a process executed by the vehicle motion controller shown in FIG. 5.

FIG. 7 shows an example of a case where the braking operation member 94 is operated when the driver assistance control is executed. As shown in section (a) of FIG. 7, the braking command value Sb is 0 in a period prior to the point in time t41. That is, in the period prior to the point in time t41, the braking operation member 94 is not operated. Thus, in the period prior to the point in time t41, the interference determining unit 120 does not determine whether the interference has occurred. At the point in time t41, the braking operation member 94 starts to be operated. After the point in time t41, the operated amount of the braking operation member 94 is increased so that the braking command value Sb becomes negative.

When the braking command value Sb is not 0 and is less than the lower limit request value Rk, the interference determining unit 120 determines that operation interference has occurred. Then, the interference determining unit 120 sets the increase prohibiting flag Ka to ON. Since the lower limit request value Rk is positive in the example shown in FIG. 7, the braking command value Sb is less than the lower limit request value Rk from the point in time at which the braking operation member 94 starts to be operated and the braking command value Sb starts to be calculated. That is, after the point in time t41, the interference determining unit 120 determines that the braking command value Sb is less than the lower limit request value Rk and determines that the operation interference has occurred. As shown in section (b) of FIG. 7, the interference determining unit 120 sets the increase prohibiting flag Ka to ON at the point in time t41. As a result, the limit processing unit 17 prohibits the feedback control amount from increasing after the point in time t41.

When the operation of the braking operation member 94 is cancelled, the interference determining unit 120 determines that the operation interference has been cancelled. Then, the interference determining unit 120 sets the increase prohibiting flag Ka to OFF.

In the example shown in FIG. 7, the decrease prohibiting flag Kb shown in section (c) of FIG. 7 is not activated by the interference determining unit 120. That is, the decrease prohibiting flag Kb remains OFF after the point in time t41. As a result, the limit processing unit 17 does not prohibit the feedback control amount from decreasing. Thus, the feedback control amount is permitted to decrease even after the point in time t41.

Next, a case where the arbitrated request value Rx is the upper limit request value Rj will be described with reference to FIGS. 8 and 9. In the example shown in FIG. 8, the upper limit request value Rj is negative as shown in section (a) of FIG. 8. In the example shown in FIG. 9, the upper limit request value Rj is positive as shown in section (a) of FIG. 9. It is assumed that the upper limit request value Rj remains unchanged over the periods illustrated in FIGS. 8 and 9.

Figure 8:
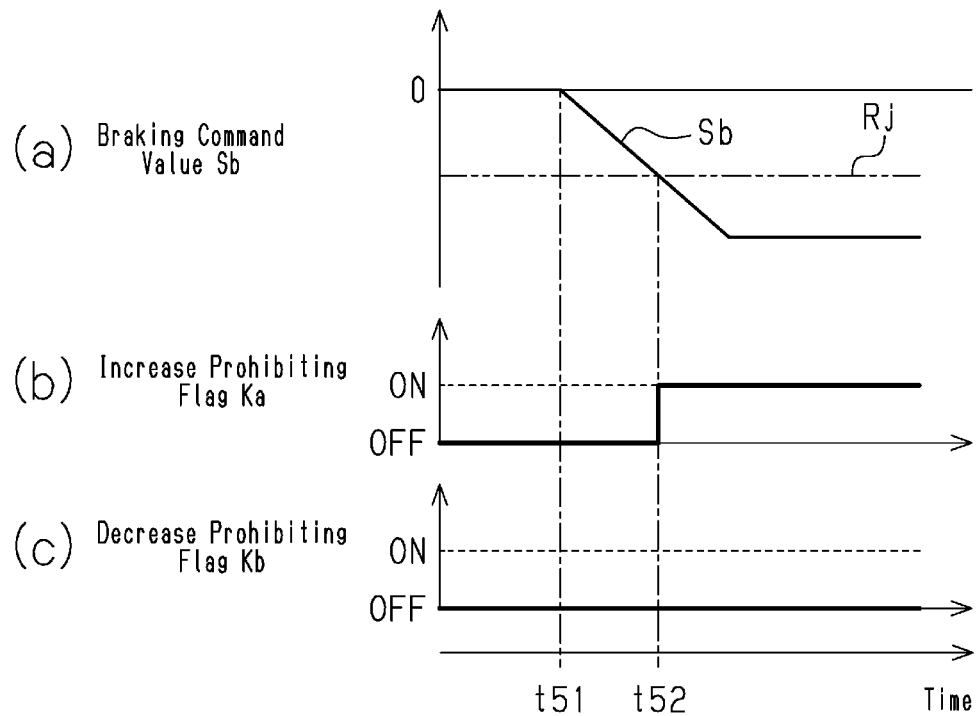
FIG. 8 is a graph illustrating a process executed by the vehicle motion controller shown in FIG. 5.

FIG. 8 shows an example of a case where the braking operation member 94 is operated when the driver assistance control is executed. As shown in section (a) of FIG. 8, the braking command value Sb is 0 in a period prior to the point in time t51. That is, in the period prior to the point in time t51, the braking operation member 94 is not operated. Thus, in the period prior to the point in time t51, the interference determining unit 120 does not determine whether the interference has occurred. At the point in time t51, the braking operation member 94 starts to be operated. After the point in time t51, the operated amount of the braking operation member 94 is increased so that the braking command value Sb becomes negative.

When the braking command value Sb is less than the upper limit request value Rj, the interference determining unit 120 determines that operation interference has occurred. Then, the interference determining unit 120 sets the increase prohibiting flag Ka to ON. In the example shown in FIG. 8, the upper limit request value Rj is less than the braking command value Sb in a period prior to the point in time t52 after the braking operation member 94 starts to be operated. After the point in time t52, at which the braking command value Sb becomes less than the upper limit request value Rj, the interference determining unit 120 determines that operation interference has occurred. As shown in section (b) of FIG. 8, the interference determining unit 120 sets the increase prohibiting flag Ka to ON at the point in time t52. As a result, the limit processing unit 17 prohibits the feedback control amount from increasing after the point in time t52.

The interference determining unit 120 determines that the operation interference has been cancelled when the braking command value Sb is increased so that the braking command value Sb becomes greater than or equal to the upper limit request value Rj. Then, the interference determining unit 120 sets the increase prohibiting flag Ka to OFF.

In the example shown in FIG. 8, the decrease prohibiting flag Kb shown in section (c) of FIG. 8 is not activated by the interference determining unit 120. That is, the decrease prohibiting flag Kb remains OFF after the point in time t52. As a result, the limit processing unit 17 does not prohibit the feedback control amount from decreasing. Thus, the feedback control amount is permitted to decrease even after the point in time t52.

Figure 9:
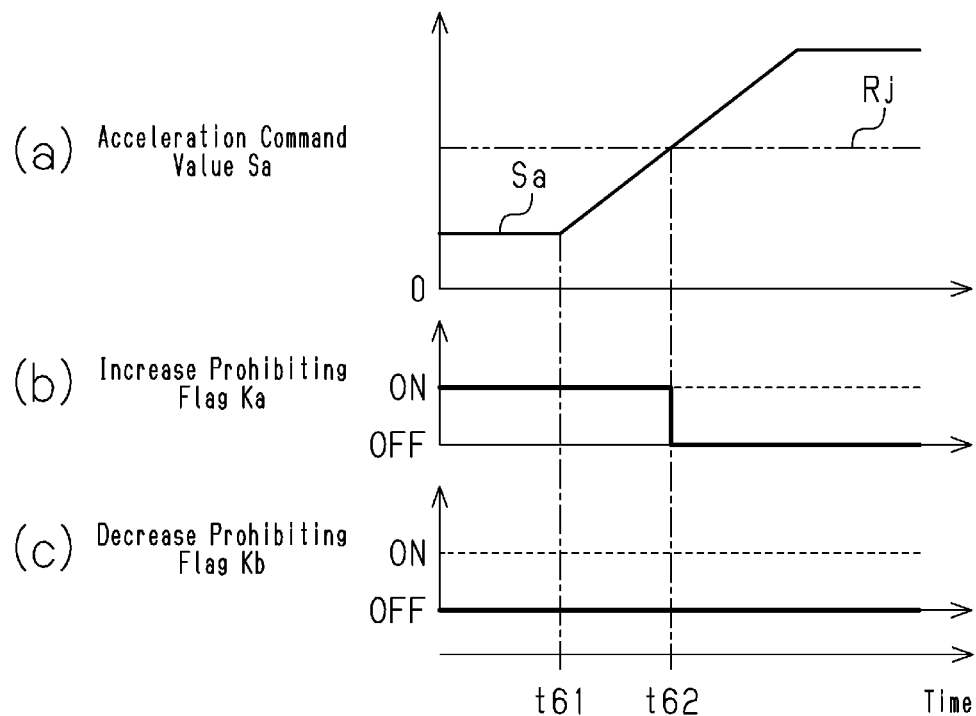
FIG. 9 is a graph illustrating a process executed by the vehicle motion controller shown in FIG. 5.

FIG. 9 shows an example of a case where the acceleration operation member 93 is operated when the driver assistance control is executed. As shown in section (a) of FIG. 9, after the point in time t61, the operated amount of the acceleration operation member 93 is increased so that the acceleration command value Sa increases. In a period prior to the point in time t62, the acceleration command value Sa is less than the upper limit request value Rj. At the point in time t62, the acceleration command value Sa reaches the upper limit request value Rj. Subsequently, the acceleration command value Sa becomes greater than the upper limit request value Rj.

When the acceleration command value Sa is less than the upper limit request value Rj, the interference determining unit 120 sets the increase prohibiting flag Ka to ON. That is, as shown in section (b) of FIG. 9, the interference determining unit 120 sets the increase prohibiting flag Ka to ON in the period prior to the point in time t62. As a result, the limit processing unit 17 prohibits the feedback control amount from increasing in the period prior to the point in time t62. That is, the determining unit 120 obtains the acceleration command value Sa calculated in correspondence with the operated amount of the acceleration operation member 93, which operates the driving device 30. When the acceleration command value Sa is less than the upper limit request value Rj, the feedback controlling unit prohibits the feedback control amount from increasing.

When the acceleration command value Sa is greater than or equal to the upper limit request value Rj, the interference determining unit 120 sets the increase prohibiting flag Ka to OFF. When the acceleration command value Sa is greater than or equal to the upper limit request value Rj, the interference determining unit 120 determines that operation interference has occurred. That is, as shown in section (b) of FIG. 9, the interference determining unit 120 sets the increase prohibiting flag Ka to OFF after the point in time t62. As a result, the limit processing unit 17 permits the feedback control amount from increasing after the point in time t62.

In the example shown in FIG. 9, the decrease prohibiting flag Kb shown in section (c) of FIG. 9 is not activated by the interference determining unit 120. That is, the decrease prohibiting flag Kb remains OFF in the period illustrated in FIG. 9. As a result, the limit processing unit 17 does not prohibit the feedback control amount from decreasing. Thus, the feedback control amount is permitted to decrease in the period illustrated in FIG. 9.

Operation and Advantages

The operation and advantages of the second embodiment will now be described.

In the same manner as the first embodiment, the vehicle motion controller 110 allows the feedback control to be continuously executed even when operation interference has occurred while taking operation interference into account.

The situation in which the acceleration command value Sa is greater than the lower limit request value Rk when the arbitrated request value Rx is the lower limit request value Rk as illustrated in FIG. 6 is, for example, a situation in which the driver attempts to accelerate the vehicle 90 when adaptive cruise control is executed. In such a case, the vehicle motion controller 110 continues the feedback control while prohibiting the feedback control amount from decreasing.

The situation in which the braking command value Sb is less than the lower limit request value Rk when the arbitrated request value Rx is the lower limit request value Rk as illustrated in FIG. 7 is, for example, a situation in which the driver attempts to decelerate the vehicle 90 when adaptive cruise control is executed. In such a case, the vehicle motion controller 110 continues the feedback control while prohibiting the feedback control amount from increasing.

The situation in which the braking command value Sb is less than the upper limit request value Rj when the arbitrated request value Rx is the upper limit request value Rj as illustrated in FIG. 8 is, for example, a situation in which the driver attempts to further decelerate the vehicle 90 when collision avoidance braking is executed. In such a case, the vehicle motion controller 110 continues the feedback control while prohibiting the feedback control amount from increasing.

In the vehicle 90, the upper limit of the longitudinal force is the upper limit request value Rj. When the arbitrated request value Rx is the upper limit request value Rj and the acceleration command value Sa has not reached the upper limit request value Rj, the driving device 30 is controlled in accordance with the acceleration command value Sa instead of the upper limit request value Rj. When the feedback control amount increases in a case where the acceleration command value Sa has not reached the upper limit request value Rj, for example, the following problem would occur at the point in time at which the acceleration command value Sa subsequently increases to reach the upper limit request value Rj. For example, at the point in time at which the acceleration command value Sa reaches the upper limit request value Rj, the longitudinal force actually acting on the vehicle 90 has already increased and thus the longitudinal force may not be able to be limited using the upper limit request value Rj.

In this regard, the vehicle motion controller 110 prohibits the feedback control amount from increasing when the acceleration command value Sa is less than the upper limit request value Rj. This prevents the longitudinal force from excessively increasing when the acceleration command value Sa is less than the upper limit request value Rj. In contrast, the vehicle motion controller 110 permits the feedback control amount to increase when the acceleration command value Sa is greater than or equal to the upper limit request value Rj. This limits the longitudinal force to the upper limit request value Rj while reducing the difference hG through the feedback control when the acceleration command value Sa is greater than or equal to the upper limit request value Rj.

In a case where the acceleration command value Sa is less than 0, the vehicle motion controller 110 prohibits the feedback control amount from increasing when the acceleration command value Sa is less than the upper limit request value Rj. For example, in a case where the driver requests engine braking without operating the acceleration operation member 93, the vehicle motion controller 110 prohibits the feedback control amount from increasing when the acceleration command value Sa is less than the upper limit request value Rj.

Modifications

The above-described first and second embodiments may be modified as follows. The above-described embodiments and the following modifications may be implemented in combination with each other as long as technical contradiction does not occur.

A replacement request value Rr, based on information from the interior monitoring system 70, may be input to the vehicle motion controllers 10, 110. The replacement request value Rr is a request value of the longitudinal force. The replacement request value Rr is output from the interior monitoring system 70 when the driver is unable to operate the vehicle 90. When the replacement request value Rr is input to the vehicle motion controllers 10, 110, the target acceleration Gt may be calculated based on the replacement request value Rr instead of the request value from the driver assistance device 60.

In the first and second embodiments, the request value Rc, the upper limit request value Rj, and the lower limit request value Rk each have a dimension of the longitudinal force. The request value from the driver assistance device 60 simply needs to correlate with the longitudinal force. The request value may have a dimension of, for example, an acceleration. In this case, the vehicle motion controllers 10, 110 do not need to calculate the target acceleration Gt and thus do not have to include the target acceleration calculating unit 14. Alternatively, the request value may have a dimension of axle torque.

Even when the request value does not have a dimension of the longitudinal force, the interference determining units 20, 120 can determine whether operation interference has occurred by matching the dimension of the request value to the dimensions of the acceleration command value Sa and the braking command value Sb.

The feedback controlling unit of each of the first and second embodiments is an example. The process that prohibits the feedback control amount from increasing or decreasing executed by the feedback controlling unit is not limited to the process explained in the above-described embodiments.

The vehicle motion controller 10, the vehicle motion controller 110, the drive controller 32, the brake controller 42, the assistance calculating unit, which are processing circuits, simply need to have any one of the following configurations [a] to [c].

[a] The circuit includes one or more processors that execute various processes in accordance with a computer program. The processor includes a processing device. Examples of the processing device include a CPU, a DSP, and a GPU. The processor includes a memory. Examples of the memory include a RAM, a ROM, and a flash memory. The memory stores program codes or instructions configured to cause the processing device to execute the processes. The memory, or a computer readable medium, includes any type of media that are accessible by general-purpose computers and dedicated computers.

[b] The circuit includes one or more dedicated hardware circuits that execute various processes. Examples of the hardware circuit include an application specific integrated circuit (ASIC), a complex programmable logic device (CPLD), and a field programmable gate array (FPGA).

[c] The circuit includes a processor that executes part of various processes in accordance with a computer program and a hardware circuit that executes the remaining processes.

The functions provided by the drive controller 32, the brake controller 42, and the assistance calculating unit may be partially or entirely provided by the vehicle motion controllers 10, 110.

The functions provided by the vehicle motion controllers 10, 110 may be provided by another processing circuit that is connected to the vehicle motion controllers 10, 110.

Another example of the friction braking device explained as an example of the braking device 40 is an electric braking device that mechanically transmits a driving force of an electric motor to press frictional members against a rotor. In this case, the electric motor corresponds to the actuator of the braking device.

The vehicle 90 does not have to include the friction braking device. In a vehicle that does not include the friction braking device, a device that generates a regenerative braking force corresponds to the braking device.

The technical ideas attainable from the above-described embodiments and the modifications are described below.

(Supplemental Claim 1) A vehicle motion control method employed in a vehicle that includes a driver assistance device that assists traveling of the vehicle, a driving device that transmits a driving force to the vehicle, and a braking device that applies a braking force to the vehicle, the vehicle motion control method automatically adjusting a traveling speed of the vehicle based on a request value from the driver assistance device, the vehicle motion control method including:

executing feedback control in which a difference between a target acceleration corresponding to the request value and an actual acceleration of the vehicle is an input, thereby calculating a control amount used to reduce the difference;

calculating a request longitudinal force based on the control amount, the request longitudinal force controlling the driving device and the braking device;

outputting the request longitudinal force to the driving device and the braking device; and in a case where a driver of the vehicle is operating a braking operation member that operates the braking device, obtaining a braking command value calculated in correspondence with an operated amount of the braking operation member, in which the calculating the control amount includes prohibiting the control amount from increasing when the braking command value is less than the request value.

(Supplemental Claim 2) A vehicle motion control method employed in a vehicle that includes a driver assistance device that assists traveling of the vehicle, a driving device that transmits a driving force to the vehicle, and a braking device that applies a braking force to the vehicle, the vehicle motion control method automatically adjusting a traveling speed of the vehicle based on a request value from the driver assistance device, the vehicle motion control method including:

executing feedback control in which a difference between a target acceleration corresponding to the request value and an actual acceleration of the vehicle is an input, thereby calculating a control amount used to reduce the difference;

calculating a request longitudinal force based on the control amount, the request longitudinal force controlling the driving device and the braking device;

outputting the request longitudinal force to the driving device and the braking device; and in a case where a driver of the vehicle is operating an acceleration operation member that operates the driving device, obtaining an acceleration command value calculated in correspondence with an operated amount of the acceleration operation member, in which the calculating the control amount includes prohibiting the control amount from decreasing when the acceleration command value is greater than the request value.

(Supplemental Claim 3) A vehicle motion control method employed in a vehicle that includes a driver assistance device that assists traveling of the vehicle, a driving device that transmits a driving force to the vehicle, and a braking device that applies a braking force to the vehicle, the vehicle motion control method automatically adjusting a traveling speed of the vehicle based on a request value from the driver assistance device, in which the request value is an upper limit request value defined as an upper limit of a longitudinal force that indicates a force acting in a longitudinal direction of the vehicle, the vehicle motion controller includes:

executing feedback control in which a difference between a target acceleration corresponding to the upper limit request value and an actual acceleration of the vehicle is an input, thereby calculating a control amount used to reduce the difference;

calculating a request longitudinal force based on the control amount, the request longitudinal force controlling the driving device and the braking device;

outputting the request longitudinal force to the driving device and the braking device; and obtaining an acceleration command value calculated in correspondence with an operated amount of an acceleration operation member that operates the driving device, and the calculating the control amount includes prohibiting the control amount from increasing when the acceleration command value is less than the upper limit request value and permitting the control amount to increase when the acceleration command value is greater than or equal to the upper limit request value.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle motion controller employed in a vehicle that includes a driver assistance device that assists traveling of the vehicle, a driving device that transmits a driving force to the vehicle, and a braking device that applies a braking force to the vehicle, the vehicle motion controller automatically adjusting a traveling speed of the vehicle based on a request value from the driver assistance device, the vehicle motion controller configured to:

execute feedback control in which a difference between a target acceleration corresponding to the request value and an actual acceleration of the vehicle is an input, thereby calculating a control amount used to reduce the difference;

calculate a request longitudinal force based on the control amount and output the request longitudinal force to the driving device and the braking device, the request longitudinal force controlling the driving device and the braking device; and in a case where a driver of the vehicle is operating a braking operation member that operates the braking device, obtain a braking command value calculated in correspondence with an operated amount of the braking operation member and determine that operation interference by the driver has occurred when the braking command value is less than the target acceleration corresponding to the request value, wherein, in the feedback control executed during a period in which it is determined that the operation interference has occurred including a point in time at which the braking command value becomes less than the target acceleration corresponding to the required value, the vehicle motion controller prohibits the control amount from increasing and permits the control amount to decrease based on the difference by continuously executing the feedback control.

2. The vehicle motion controller according to claim 1, wherein the vehicle motion controller is further configured to:

set an increase prohibiting flag to ON when it is determined that the operation interference has occurred, when the control amount is calculated with the increase prohibiting flag ON, compare the calculated control amount with a previous control amount that served as the basis for calculating the requested longitudinal force previously, when the calculated control amount is greater than or equal to the previous control amount, calculate the requested longitudinal force based on the previous control amount, and when the calculated control amount is less than the previous control amount, calculate the requested longitudinal force based on the calculated control amount.

3. A vehicle motion controller employed in a vehicle that includes a driver assistance device that assists traveling of the vehicle, a driving device that transmits a driving force to the vehicle, and a braking device that applies a braking force to the vehicle, the vehicle motion controller automatically adjusting a traveling speed of the vehicle based on a request value from the driver assistance device, the vehicle motion controller configured to:

execute feedback control in which a difference between a target acceleration corresponding to the request value and an actual acceleration of the vehicle is an input, thereby calculating a control amount used to reduce the difference;

calculate a request longitudinal force based on the control amount and output the request longitudinal force to the driving device and the braking device, the request longitudinal force controlling the driving device and the braking device; and in a case where a driver of the vehicle is operating an acceleration operation member that operates the driving device, obtain an acceleration command value calculated in correspondence with an operated amount of the acceleration operation member and determine that operation interference by the driver has occurred when the acceleration command value is greater than the target acceleration corresponding to the request value, wherein, in the feedback control executed during a period in which it is determined that the operation interference has occurred including a point in time at which the acceleration command value becomes greater than the target acceleration corresponding to the required value, the vehicle motion controller prohibits the control amount from decreasing and permits the control amount to increase based on the difference by continuously executing the feedback control.

4. The vehicle motion controller according to claim 3, wherein the vehicle motion controller is further configured to:
set a decrease prohibiting flag to ON when it is determined that the operation interference has occurred,
when the control amount is calculated with the decrease prohibiting flag ON, compare the calculated control amount with a previous control amount that served as the basis for calculating the requested longitudinal force previously, when the calculated control amount is less than or equal to the previous control amount, calculate the requested longitudinal force based on the previous control amount, and when the calculated control amount is greater than the previous control amount, calculate the requested longitudinal force based on the calculated control amount.

5. A vehicle motion controller employed in a vehicle that includes a driver assistance device that assists traveling of the vehicle, a driving device that transmits a driving force to the vehicle, and a braking device that applies a braking force to the vehicle, the vehicle motion controller automatically adjusting a traveling speed of the vehicle based on a request value from the driver assistance device, wherein the request value is an upper limit request value defined as an upper limit of a longitudinal force that indicates a force acting in a longitudinal direction of the vehicle, the vehicle motion controller is configured to:
execute feedback control in which a difference between a target acceleration corresponding to the upper limit request value and an actual acceleration of the vehicle is an input, thereby calculating a control amount used to reduce the difference;

calculate a request longitudinal force based on the control amount and output the request longitudinal force to the driving device and the braking device, the request longitudinal force controlling the driving device and the braking device; and obtain an acceleration command value calculated in correspondence with an operated amount of an acceleration operation member that operates the driving device, and the vehicle motion controller prohibits the control amount from increasing in the feedback control executed during a period in which the acceleration command value is less than the target acceleration corresponding to the upper limit request value including a point in time at which the acceleration command value becomes less than the target acceleration corresponding to the upper limit required value and permits the control amount to increase based on the difference by continuously executing the feedback control in the feedback control executed during a period in which the acceleration command value is greater than or equal to the target acceleration corresponding to the upper limit request value including a point in time at which the acceleration command value becomes greater than or equal to the target acceleration corresponding to the upper limit required value.

* * * * *